(12) United States Patent
Zahavi et al.

(10) Patent No.: US 8,230,051 B1
(45) Date of Patent: *Jul. 24, 2012

(54) METHOD AND APPARATUS FOR MAPPING AND IDENTIFYING RESOURCES FOR NETWORK-BASED SERVICES

(75) Inventors: William Zahavi, Westborough, MA (US); Amanuel Ronen Artzi, Framingham, MA (US); David Ohsie, Baltimore, MD (US); William Kuhhirte, Redington Shores, FL (US)

(73) Assignee: EMC Corporation, Hopkinton, MA (US)

( * ) Notice: Subject to any disclaimer, the term of this patent is extended or adjusted under 35 U.S.C. 154(b) by 692 days.

This patent is subject to a terminal disclaimer.

(21) Appl. No.: 11/475,775

(22) Filed: Jun. 27, 2006

(51) Int. Cl.
*G06F 15/173* (2006.01)

(52) U.S. Cl. ........ 709/223; 709/203; 709/224; 709/226; 714/47.2; 714/25

(58) Field of Classification Search .................. 709/226, 709/203, 223–224; 714/47, 47.2, 25
See application file for complete search history.

(56) References Cited

U.S. PATENT DOCUMENTS

| | | | |
|---|---|---|---|
| 6,738,933 B2 * | 5/2004 | Fraenkel et al. | 714/47.2 |
| 7,318,178 B2 | 1/2008 | Steingberg et al. | |
| 7,340,649 B2 | 3/2008 | Angamuthu et al. | |
| 7,383,191 B1 | 6/2008 | Herring et al. | |
| 2003/0005112 A1 * | 1/2003 | Krautkremer | 709/224 |
| 2003/0065986 A1 * | 4/2003 | Fraenkel et al. | 714/47 |
| 2003/0093527 A1 * | 5/2003 | Rolia | 709/226 |
| 2003/0191829 A1 * | 10/2003 | Masters et al. | 709/223 |
| 2004/0010592 A1 * | 1/2004 | Carver et al. | 709/226 |
| 2004/0122942 A1 * | 6/2004 | Green et al. | 709/224 |
| 2005/0131982 A1 * | 6/2005 | Yamasaki et al. | 709/200 |
| 2006/0074946 A1 | 4/2006 | Pham | |
| 2006/0095570 A1 | 5/2006 | O'Sullivan | |
| 2006/0101308 A1 | 5/2006 | Agarwal et al. | |
| 2008/0177698 A1 | 7/2008 | Agarwal et al. | |

* cited by examiner

*Primary Examiner* — Firmin Backer
*Assistant Examiner* — Michael A Chambers
(74) *Attorney, Agent, or Firm* — Krishnendu Gupta; Joseph D'Angelo

(57) ABSTRACT

A method, apparatus and computer-program product for mapping and identifying resources in network based services is disclosed. The method comprises the steps of determining a measure of utilization for each of the selected transactions, generating an indication for each measure of utilization exceeding an associated utilization threshold value, determining the cause of the measure of utilization exceeding the associated utilization threshold value by correlating the transactions generating the indications with the resources executing the transaction and applying additional resources until the measure of utilization is less than the associated threshold. In one aspect of the invention, balancing the measure of utilization associated with each of the selected transactions occurs to maintain each of the measures of utilization within a substantially known tolerance to each other measure of utilization.

15 Claims, 19 Drawing Sheets

|                      | SP1  | SP2  | SP3  | SP4  | SP5  |
|----------------------|------|------|------|------|------|
| SP1                  | 1.00 |      |      |      |      |
| SP2                  |      | 1.00 |      |      |      |
| SP3                  |      |      | 1.00 |      |      |
| SP4                  |      |      |      | 1.00 |      |
| SP5                  |      |      |      |      | 1.00 |
| ACCOUNTS RECEIVABLE  |      |      |      |      |      |
| t1                   |      | 1.00 | 1.00 |      | 1.00 |
| t2                   |      | 1.00 | 1.00 |      | 1.00 |
| t3                   |      | 1.00 | 1.00 |      | 1.00 |
| ORDER ENTRY          |      |      |      |      |      |
| t4                   |      | 1.00 | 1.00 | 1.00 | 1.00 |
| t5                   |      | 1.00 | 1.00 | 1.00 |      |
| t6                   |      | 1.00 | 1.00 | 1.00 | 1.00 |
| WAREHOUSE            |      |      |      |      |      |
| t7                   |      |      | 1.00 | 1.00 | 1.00 |
| t8                   |      |      | 1.00 | 1.00 | 1.00 |
| t9                   |      |      | 1.00 | 1.00 | 1.00 |

FIG. 5C

|  | | 260.1 Accounts Receiveable 660 | | | | 260.2 Order Entry 670 | | | | 260.3 Warehouse 680 | |
|---|---|---|---|---|---|---|---|---|---|---|---|
|  | | t1 | t2 | t3 | t4 | t5 | t6 | t7 | t8 | t9 | |
| Max Application Deg. Factor | | 10.00 | 10.00 | 10.00 | 100.00 | 10.00 | 10.00 | 10.00 | 10.00 | 10.00 | |
| Transaction Rate: Transaction Deg. Factor | | 3.04 | 2.98 | 2.94 | 4.18 | 4.17 | 4.16 | 3.62 | 3.63 | 3.63 | |
| WebServer 280 # Units: 4.00 Util: 4.50% 610 | Service Demand: Cum. Demand at SP Avg. Response Time SD Deg. Factor | 5.00 50.00 5.24 1.05 | 6.00 60.00 6.28 1.05 | 7.00 70.00 7.33 1.05 | | | | | | | |
| LanLink 282 # Units: 4.00 Util: 49.50% 620 | Service Demand: Cum. Demand at SP Avg. Response Time SD Deg. Factor | 8.00 80.00 15.84 1.98 | 9.00 90.00 17.82 1.98 | 10.00 100.00 19.80 1.98 | 14.00 1400.00 27.72 1.98 | 15.00 150.00 29.70 1.98 | 16.00 160.00 31.68 1.98 | | | | |
| AppServer 284 # Units: 4.00 Util: 78.75% 630 | Service Demand: Cum. Demand at SP Avg. Response Time SD Deg. Factor | 11.00 110.00 51.76 4.71 | 12.00 120.00 56.47 4.71 | 13.00 130.00 61.18 4.71 | 17.00 1700.00 80.00 4.71 | 18.00 180.00 84.71 4.71 | 19.00 190.00 89.41 4.71 | 23.00 230.00 108.24 4.71 | 24.00 240.00 112.94 4.71 | 25.00 250.00 117.65 4.71 | |
| DBServer 286 # Units: 4.00 Util: 81.00% 640 | | | | | 20.00 2000.00 105.26 5.26 | 21.00 210.00 110.53 5.26 | 22.00 220.00 115.79 5.26 | 26.00 260.00 136.84 5.26 | 27.00 270.00 142.11 5.26 | 28.00 280.00 147.37 5.26 | |
| StorageArra 288 # Units: 4.00 Util: 22.50% 650 | | | | | | | | 29.00 290.00 37.42 1.29 | 30.00 300.00 38.71 1.29 | 31.00 310.00 40.00 1.29 | |

FIG. 6A

|  | Accounts Receiveable 2.12 | | | Order Entry 3.51 | | | Warehouse 3.03 | | |
|---|---|---|---|---|---|---|---|---|---|
| Max Application Deg. Factor | t1 | t2 | t3 | t4 | t5 | t6 | t7 | t8 | t9 |
| Transaction Rate: | 10.00 | 10.00 | 10.00 | 100.00 | 10.00 | 10.00 | 10.00 | 10.00 | 10.00 |
| Transaction Deg. Factor | 2.12 | 2.09 | 2.08 | 3.51 | 3.50 | 3.49 | 3.03 | 3.03 | 3.03 |
| Service Demand: | 5.00 | 6.00 | 7.00 | | | | | | |
| Cum. Demand at SP | 50.00 | 60.00 | 70.00 | | | | | | |
| Avg. Response Time | 5.24 | 6.28 | 7.33 | | | | | | |
| SD Deg. Factor | 1.05 | 1.05 | 1.05 | | | | | | |
| Service Demand: | 8.00 | 9.00 | 10.00 | 14.00 | 15.00 | 16.00 | | | |
| Cum. Demand at SP | 80.00 | 90.00 | 100.00 | 1400.00 | 150.00 | 160.00 | | | |
| Avg. Response Time | 15.84 | 17.82 | 19.80 | 27.72 | 29.70 | 31.68 | | | |
| SD Deg. Factor | 1.98 | 1.98 | 1.98 | 1.98 | 1.98 | 1.98 | | | |
| Service Demand: | 11.00 | 12.00 | 13.00 | 17.00 | 18.00 | 19.00 | 23.00 | 24.00 | 25.00 |
| Cum. Demand at SP | 110.00 | 120.00 | 130.00 | 1700.00 | 180.00 | 190.00 | 230.00 | 240.00 | 250.00 |
| Avg. Response Time | 29.73 | 32.43 | 35.14 | 45.95 | 48.65 | 51.35 | 62.16 | 64.86 | 67.57 |
| SD Deg. Factor | 2.70 | 2.70 | 2.70 | 2.70 | 2.70 | 2.70 | 2.70 | 2.70 | 2.70 |
| Service Demand: | | | | 20.00 | 21.00 | 22.00 | 26.00 | 27.00 | 28.00 |
| Cum. Demand at SP | | | | 2000.00 | 210.00 | 220.00 | 260.00 | 270.00 | 280.00 |
| Avg. Response Time | | | | 105.26 | 110.53 | 115.79 | 136.84 | 142.11 | 147.37 |
| SD Deg. Factor | | | | 5.26 | 5.26 | 5.26 | 5.26 | 5.26 | 5.26 |
| Service Demand: | | | | | | | 29.00 | 30.00 | 31.00 |
| Cum. Demand at SP | | | | | | | 290.00 | 300.00 | 310.00 |
| Avg. Response Time | | | | | | | 37.42 | 38.71 | 40.00 |
| SD Deg. Factor | | | | | | | 1.29 | 1.29 | 1.29 |

WebServer # Units: 4.00
Util 4.50%

LanLink # Units: 4.00
Util 49.50%

AppServer # Units: 5.00
Util 63.00%

DBServer # Units: 4.00
Util 81.00%

StoreageArra # Units: 4.00
Util 22.50%

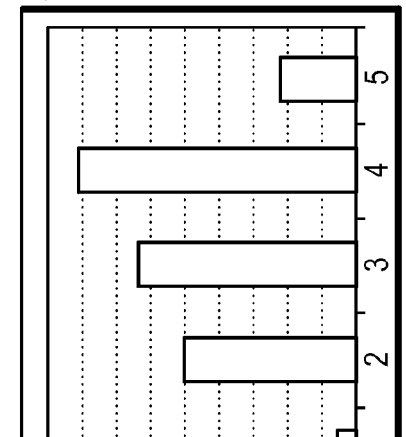

| | | | Accounts Receiveable 2.12 | | | | Order Entry 2.56 | | | | Warehouse 2.23 | | |
|---|---|---|---|---|---|---|---|---|---|---|---|---|---|
| | | | t1 | t2 | t3 | t4 | t5 | t6 | t7 | t8 | t9 | | |
| Max Application Deg. Factor | | | 10.00 | 10.00 | 10.00 | 100.00 | 10.00 | 10.00 | 10.00 | 10.00 | 10.00 | | |
| Transaction Rate: | | | 2.12 | 2.09 | 2.08 | 2.56 | 2.56 | 2.55 | 2.22 | 2.23 | 2.23 | | |
| Transaction Deg. Factor | | | | | | | | | | | | | |
| WebServer | # Units: | 4.00 | Service Demand: | 5.00 | 6.00 | 7.00 | | | | | | | |
| | Util | 4.50% | Cum. Demand at SP | 50.00 | 60.00 | 70.00 | | | | | | | |
| | | | Avg. Response Time | 5.24 | 6.28 | 7.33 | | | | | | | |
| | | | SD Deg. Factor | 1.05 | 1.05 | 1.05 | | | | | | | |
| LanLink | # Units: | 4.00 | Service Demand: | 8.00 | 9.00 | 10.00 | 14.00 | 15.00 | 16.00 | | | | |
| | Util | 49.50% | Cum. Demand at SP | 80.00 | 90.00 | 100.00 | 1400.00 | 150.00 | 160.00 | | | | |
| | | | Avg. Response Time | 15.84 | 17.82 | 19.80 | 27.72 | 29.70 | 31.68 | | | | |
| | | | SD Deg. Factor | 1.98 | 1.98 | 1.98 | 1.98 | 1.98 | 1.98 | | | | |
| 284 AppServer | # Units: | 5.00 | Service Demand: | 11.00 | 12.00 | 13.00 | 17.00 | 18.00 | 19.00 | 23.00 | 24.00 | 25.00 | |
| | Util | 63.00% | Cum. Demand at SP | 110.00 | 120.00 | 130.00 | 1700.00 | 180.00 | 190.00 | 230.00 | 240.00 | 250.00 | |
| | | | Avg. Response Time | 29.73 | 32.43 | 35.14 | 45.95 | 48.65 | 51.35 | 62.16 | 64.86 | 67.57 | |
| | | | SD Deg. Factor | 2.70 | 2.70 | 2.70 | 2.70 | 2.70 | 2.70 | 2.70 | 2.70 | 2.70 | |
| 286 DBServer | # Units: | 5.00 | Service Demand: | | | | 20.00 | 21.00 | 22.00 | 26.00 | 27.00 | 28.00 | |
| | Util | 64.80% | Cum. Demand at SP | | | | 2000.00 | 210.00 | 220.00 | 260.00 | 270.00 | 280.00 | |
| | | | Avg. Response Time | | | | 56.82 | 59.66 | 62.50 | 73.86 | 76.70 | 79.55 | |
| | | | SD Deg. Factor | | | | 2.84 | 2.84 | 2.84 | 2.84 | 2.84 | 2.84 | |
| StoreageArra | # Units: | 4.00 | | | | | | | | 29.00 | 30.00 | 31.00 | |
| | Util | 22.50% | | | | | | | | 290.00 | 300.00 | 310.00 | |
| | | | | | | | | | | 37.42 | 38.71 | 40.00 | |
| | | | | | | | | | | 1.29 | 1.29 | 1.29 | |

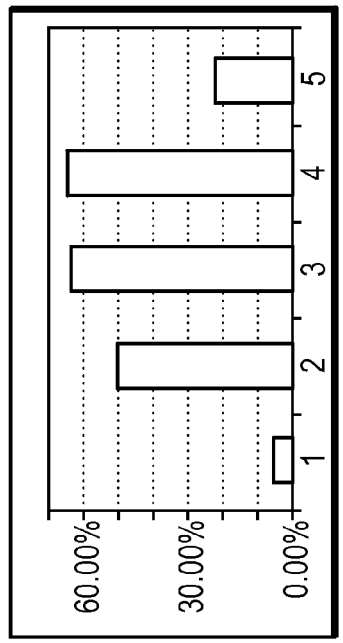

|  | Accounts Receivable 2.44 | | | Order Entry 2.82 | | | Warehouse 2.42 | | |
|---|---|---|---|---|---|---|---|---|---|
|  | t1 | t2 | t3 | t4 | t5 | t6 | t7 | t8 | t9 |
| Max Application Deg. Factor | 2.44 | 2.41 | 2.40 | 2.82 | 2.82 | 2.82 | 2.42 | 2.42 | 2.42 |
| Transaction Rate: | 10.00 | 10.00 | 10.00 | 100.00 | 10.00 | 10.00 | 10.00 | 10.00 | 10.00 |
| Transaction Deg. Factor: | 2.44 | 2.41 | 2.40 | 2.82 | 2.82 | 2.82 | 2.42 | 2.42 | 2.42 |
| WebServer # Units: 4.00 Util 4.50% | | | | | | | | | |
| Service Demand: | 5.00 | 6.00 | 7.00 | | | | | | |
| Cum. Demand at SP: | 50.00 | 60.00 | 70.00 | | | | | | |
| Avg. Response Time: | 5.24 | 6.28 | 7.33 | | | | | | |
| SD Deg. Factor: | 1.05 | 1.05 | 1.05 | | | | | | |
| LanLink # Units: 3.00 Util 66.00% | | | | | | | | | |
| Service Demand: | 8.00 | 9.00 | 10.00 | 14.00 | 15.00 | 16.00 | | | |
| Cum. Demand at SP: | 80.00 | 90.00 | 100.00 | 1400.00 | 150.00 | 160.00 | | | |
| Avg. Response Time: | 23.53 | 26.47 | 29.41 | 41.18 | 44.12 | 47.06 | | | |
| SD Deg. Factor: | 2.94 | 2.94 | 2.94 | 2.94 | 2.94 | 2.94 | | | |
| AppServer # Units: 5.00 Util 63.00% | | | | | | | | | |
| Service Demand: | 11.00 | 12.00 | 13.00 | 17.00 | 18.00 | 19.00 | 23.00 | 24.00 | 25.00 |
| Cum. Demand at SP: | 110.00 | 120.00 | 130.00 | 1700.00 | 180.00 | 190.00 | 230.00 | 240.00 | 250.00 |
| Avg. Response Time: | 29.73 | 32.43 | 35.14 | 45.95 | 48.65 | 51.35 | 62.16 | 64.86 | 67.57 |
| SD Deg. Factor: | 2.70 | 2.70 | 2.70 | 2.70 | 2.70 | 2.70 | 2.70 | 2.70 | 2.70 |
| DBServer # Units: 5.00 Util 64.80% | | | | | | | | | |
| Service Demand: | | | | 20.00 | 21.00 | 22.00 | 26.00 | 27.00 | 28.00 |
| Cum. Demand at SP: | | | | 2000.00 | 210.00 | 220.00 | 260.00 | 270.00 | 280.00 |
| Avg. Response Time: | | | | 56.82 | 59.66 | 62.50 | 73.86 | 76.70 | 79.55 |
| SD Deg. Factor: | | | | 2.84 | 2.84 | 2.84 | 2.84 | 2.84 | 2.84 |
| 288 StoreageArra # Units: 2.00 Util 45.00% | | | | | | | | | |
| Service Demand: | | | | | | | 29.00 | 30.00 | 31.00 |
| Cum. Demand at SP: | | | | | | | 290.00 | 300.00 | 310.00 |
| Avg. Response Time: | | | | | | | 52.73 | 54.55 | 56.36 |
| SD Deg. Factor: | | | | | | | 1.82 | 1.82 | 1.82 |

FIG. 6E

|  |  |  | Accounts Receiveable 2.44 | | | Order Entry 2.82 | | | Warehouse 2.42 | | |
| --- | --- | --- | --- | --- | --- | --- | --- | --- | --- | --- | --- |
|  |  | Max Application Deg. Factor | t1 | t2 | t3 | t4 | t5 | t6 | t7 | t8 | t9 |
|  |  | Transaction Rate: | 10.00 | 10.00 | 10.00 | 100.00 | 10.00 | 10.00 | 10.00 | 10.00 | 10.00 |
|  |  | Transaction Deg. Factor | 2.44 | 2.42 | 2.40 | 2.82 | 2.82 | 2.82 | 2.42 | 2.42 | 2.42 |
| WebServer | # Units: 3.00 Util 6.00% | Service Demand: Cum. Demand at SP Avg. Response Time SD Deg. Factor | 5.00 50.00 5.32 1.06 | 6.00 60.00 6.38 1.06 | 7.00 70.00 7.45 1.06 |  |  |  |  |  |  |
| LanLink | # Units: 3.00 Util 66.00% | Service Demand: Cum. Demand at SP Avg. Response Time SD Deg. Factor | 8.00 80.00 23.53 2.94 | 9.00 90.00 26.47 2.94 | 10.00 100.00 29.41 2.94 | 14.00 1400.00 41.18 2.94 | 15.00 150.00 44.12 2.94 | 16.00 160.00 47.06 2.94 |  |  |  |
| AppServer | # Units: 5.00 Util 63.00% | Service Demand: Cum. Demand at SP Avg. Response Time SD Deg. Factor | 11.00 110.00 29.73 2.70 | 12.00 120.00 32.43 2.70 | 13.00 130.00 35.14 2.70 | 17.00 1700.00 45.95 2.70 | 18.00 180.00 48.65 2.70 | 19.00 190.00 51.35 2.70 | 23.00 230.00 62.16 2.70 | 24.00 240.00 64.86 2.70 | 25.00 250.00 67.57 2.70 |
| DBServer | # Units: 5.00 Util 64.80% | Service Demand: Cum. Demand at SP Avg. Response Time SD Deg. Factor |  |  |  | 20.00 2000.00 56.82 2.84 | 21.00 210.00 59.66 2.84 | 22.00 220.00 62.50 2.84 | 26.00 260.00 73.86 2.84 | 27.00 270.00 76.70 2.84 | 28.00 280.00 79.55 2.84 |
| StoreageArra | # Units: 2.00 Util 45.00% | Service Demand: Cum. Demand at SP Avg. Response Time SD Deg. Factor |  |  |  |  |  |  | 29.00 290.00 52.73 1.82 | 30.00 300.00 54.55 1.82 | 31.00 310.00 56.36 1.82 |

FIG. 6G

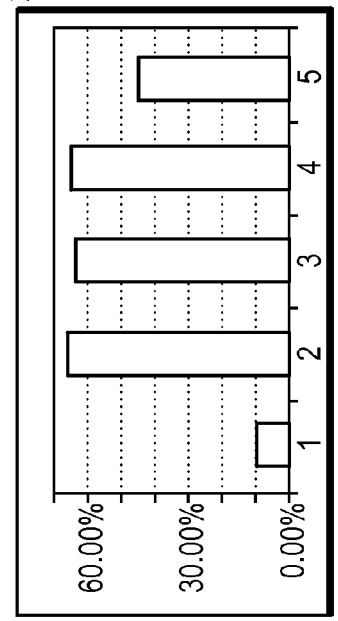

|  | Accounts Receiveable 2.45 | | | Order Entry 2.82 | | | Warehouse 2.42 | | |
|---|---|---|---|---|---|---|---|---|---|
| Max Application Deg. Factor | t1 | t2 | t3 | t4 | t5 | t6 | t7 | t8 | t9 |
| Transaction Rate: | 10.00 | 10.00 | 10.00 | 100.00 | 10.00 | 10.00 | 10.00 | 10.00 | 10.00 |
| Transaction Deg. Factor | 2.45 | 2.43 | 2.41 | 2.82 | 2.82 | 2.82 | 2.42 | 2.42 | 2.42 |
| WebServer Service Demand: | 5.00 | 6.00 | 7.00 | | | | | | |
| Cum. Demand at SP | 50.00 | 60.00 | 70.00 | | | | | | |
| Avg. Response Time | 5.49 | 6.59 | 7.69 | | | | | | |
| SD Deg. Factor | 1.10 | 1.10 | 1.10 | | | | | | |
| LanLink Service Demand: | 8.00 | 9.00 | 10.00 | 14.00 | 15.00 | 16.00 | | | |
| Cum. Demand at SP | 80.00 | 90.00 | 100.00 | 1400.00 | 150.00 | 160.00 | | | |
| Avg. Response Time | 23.53 | 26.47 | 29.41 | 41.18 | 44.12 | 47.06 | | | |
| SD Deg. Factor | 2.94 | 2.94 | 2.94 | 2.94 | 2.94 | 2.94 | | | |
| AppServer Service Demand: | 11.00 | 12.00 | 13.00 | 17.00 | 18.00 | 19.00 | 23.00 | 24.00 | 25.00 |
| Cum. Demand at SP | 110.00 | 120.00 | 130.00 | 1700.00 | 180.00 | 190.00 | 230.00 | 240.00 | 250.00 |
| Avg. Response Time | 29.73 | 32.43 | 35.14 | 45.95 | 48.65 | 51.35 | 62.16 | 64.86 | 67.57 |
| SD Deg. Factor | 2.70 | 2.70 | 2.70 | 2.70 | 2.70 | 2.70 | 2.70 | 2.70 | 2.70 |
| DBServer Service Demand: | | | | 20.00 | 21.00 | 22.00 | 26.00 | 27.00 | 28.00 |
| Cum. Demand at SP | | | | 2000.00 | 210.00 | 220.00 | 260.00 | 270.00 | 280.00 |
| Avg. Response Time | | | | 56.82 | 59.66 | 62.50 | 73.86 | 76.70 | 79.55 |
| SD Deg. Factor | | | | 2.84 | 2.84 | 2.84 | 2.84 | 2.84 | 2.84 |
| StoreageArra Service Demand: | | | | | | | 29.00 | 30.00 | 31.00 |
| Cum. Demand at SP | | | | | | | 290.00 | 300.00 | 310.00 |
| Avg. Response Time | | | | | | | 52.73 | 54.55 | 56.36 |
| SD Deg. Factor | | | | | | | 1.82 | 1.82 | 1.82 |

| | # Units: | Util |
|---|---|---|
| WebServer | 2.00 | 9.00% |
| LanLink | 3.00 | 66.00% |
| AppServer | 5.00 | 63.00% |
| DBServer | 5.00 | 64.80% |
| StoreageArra | 2.00 | 45.00% |

FIG. 61

METHOD AND APPARATUS FOR MAPPING AND IDENTIFYING RESOURCES FOR NETWORK-BASED SERVICES

RELATED APPLICATIONS

This application is related to that patent application concurrently filed in the US Patent and Trademark Office, entitled "Method and Apparatus for Mapping and Identifying the Root Causes of Performance Problems in Network-based Services" and afforded Ser. No. 11/475,774, the contents of which are incorporated by reference herein.

FIELD OF THE INVENTION

This application relates to the field of network management, and more particularly to network performance and configuration management.

BACKGROUND

Network management is an actively pursued field of endeavor requiring skilled persons with detailed knowledge of network operation. Whether constructing new networks, or adapting or maintaining existing networks, the skills of the operating personnel are needed to provide efficient and cost-effective networks that satisfy specific operating conditions that may be provided in a service level agreement (SLA). Typically, SLA represents criteria such as quality of service (QoS), response time, guaranteed network up-time, etc.

In network construction or maintenance the skills of the network architect are a critical element in the overall network performance. The network architect, with knowledge of the specifications associated with hardware and software equipment (referred to as Service Level Objectives, SLOs) in the underlying infrastructure configuration must translate the SLOs into a measurable higher level network performance (SLA). SLOs typically may represent factors such as CPU utilization, link utilization, inputs/outputs per second, etc.

To perform such a translation, the network architect must balance the number, location, and type of hardware and software that must be deployed to satisfy a specific higher level operating condition; too much equipment and the desired operating conditions are satisfied, but at a cost for purchase and maintenance of equipment; while too little equipment may fail to satisfy certain ones of the operating conditions. Alternatively, just the right amount of equipment may satisfy the desired operating condition when the network is fully operating, but may fail to provide sufficient support when one or more equipments fail or are operating at levels for which they are not designed. Such trading cost of the network infrastructure for overall network performance is a skill that is expensive for companies to retain and for persons to maintain. An incorrect trade-off can result in costing the network owner a significant expense, in dollars, for having too much capability or the expense, in business relationships, of having too little capability.

Even with the best analysis, simulation and/or experience, the network may experience increases, or bursts of data flow, which are beyond the expected and designed capability of the system. In this case, the observed performance of a service may be significantly degraded as bottlenecks are created in the network. These bottlenecks may be caused by one or more network hardware or software element(s) or component(s) operating at conditions beyond their capability.

In some cases, the bottlenecks, once identified, may be corrected by the introduction of additional supporting hardware or software, providing new data path and or reducing access to the network. However, reducing access to the network merely increases the delay in the system perceived by new users and fails to correct the conditions causing the bottleneck and providing new data path may not be practical as the communications links may be fixed.

Hence, there is a need in the industry for a method and apparatus for determining factors contributing to degradation and providing appropriate measures to correct the degradation before network performance degradation is observed.

SUMMARY OF THE INVENTION

A method, apparatus and computer-program product for mapping and identifying resources in network based services is disclosed. The method comprises the steps of determining a measure of utilization for each of the selected transactions, generating an indication for each measure of utilization exceeding an associated utilization threshold value, determining the cause of the measure of utilization exceeding the associated utilization threshold value by correlating the transactions generating the indications with the resources executing the transaction and applying additional resources until the measure of utilization is less than the associated threshold. In one aspect of the invention, balancing the measure of utilization associated with each of the selected transactions occurs to maintain each of the measures of utilization within a substantially known tolerance to each other measure of utilization.

BRIEF DESCRIPTION OF THE FIGURES

The above and further advantages of the present invention may be better understood by referring to the following description taken into conjunction with the accompanying drawings in which:

FIGS. 5A-5C illustrate an example for modeling and monitoring operating conditions in accordance with the principles of the invention;

FIGS. 6A-6I collectively illustrate an example of allocating network elements to relieve detected degradation in accordance with the principles of the invention.

Figure 1:
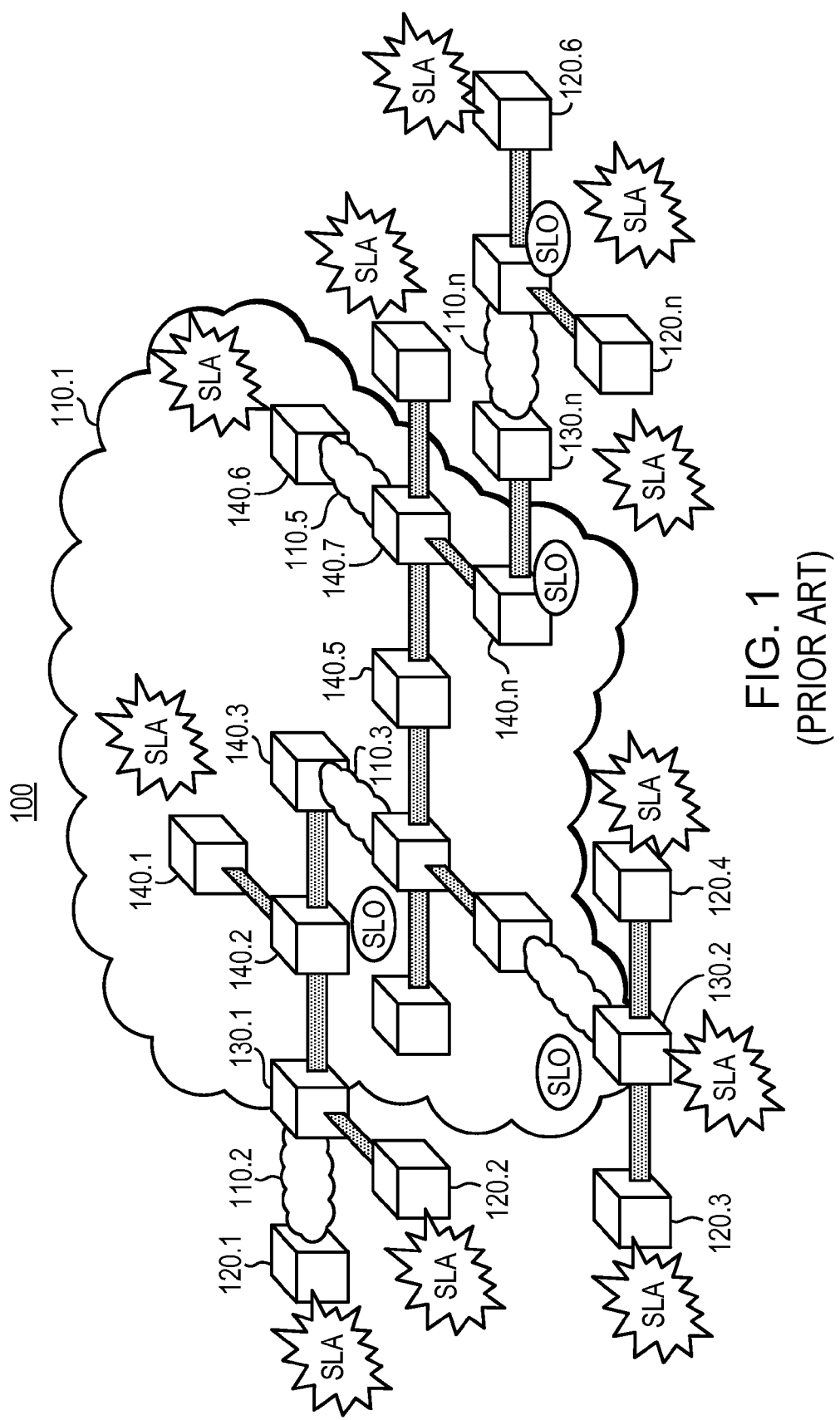
FIG. 1 illustrates a conventional network performing typical transactions.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements

DETAIL DESCRIPTION

FIG. 1 illustrates an exemplary network 100 for conducting transactions over one or more networks 110.1, 110.2, . . . 110.6. In this illustrative network, the network devices, referred to as 120.1, . . . 120.n, 130.1 . . . 130.n and 140.1 . . . 140.n, represent routers, servers, switches, input/output stations, etc., that constitute a network 100 and are suitable for completing a transaction. More specifically, each of the elements of network 100 may be, but need not be controlled or operated by a single source or entity and requires the cooperative interaction between the elements. For example, network 110.2 between devices 120.1 and 130.1 may represent a local area network (LAN) between a user station 120.1 and a gateway 130.1 to the illustratively broader network 110.1; e.g., the internet. On the other hand devices 120.3 and 120.4 may have a direct link to gateway 130.2 to the broader network 110. Similarly, the devices within network 110 may be interconnected using direct link, e.g., device 140.4 to 140.5, or using subnetworks, e.g., 110.3, between devices 140.4 and 140.1.

Also illustrated is that each of the devices is associated with an SLO (Service Level Objective) and selected ones of the devices are associated with SLAs (Service Level Agreements). A Service Level Objective is a measurement of a performance, whether desired or actual, associated with a device. For example, device 130.2, network 110.4 and device 140.4 may each have an SLO associated with utilization, capacity and/or bandwidth. Utilization may be the measure of a CPU usage, a memory usage, a data rate transfer, etc. A Service Level Agreement is a measure of an end-to-end performance of a higher level function, e.g., an application, hosted or performed by the underlying infrastructure or network configuration. For example, device 130.2 may also have an associated SLA with a transaction that is performed by an application. An SLA may, for example, be represented as the time from when an entry is made on device 120.1 until a response to the entry is received back at device 120.1.

Figure 2A:
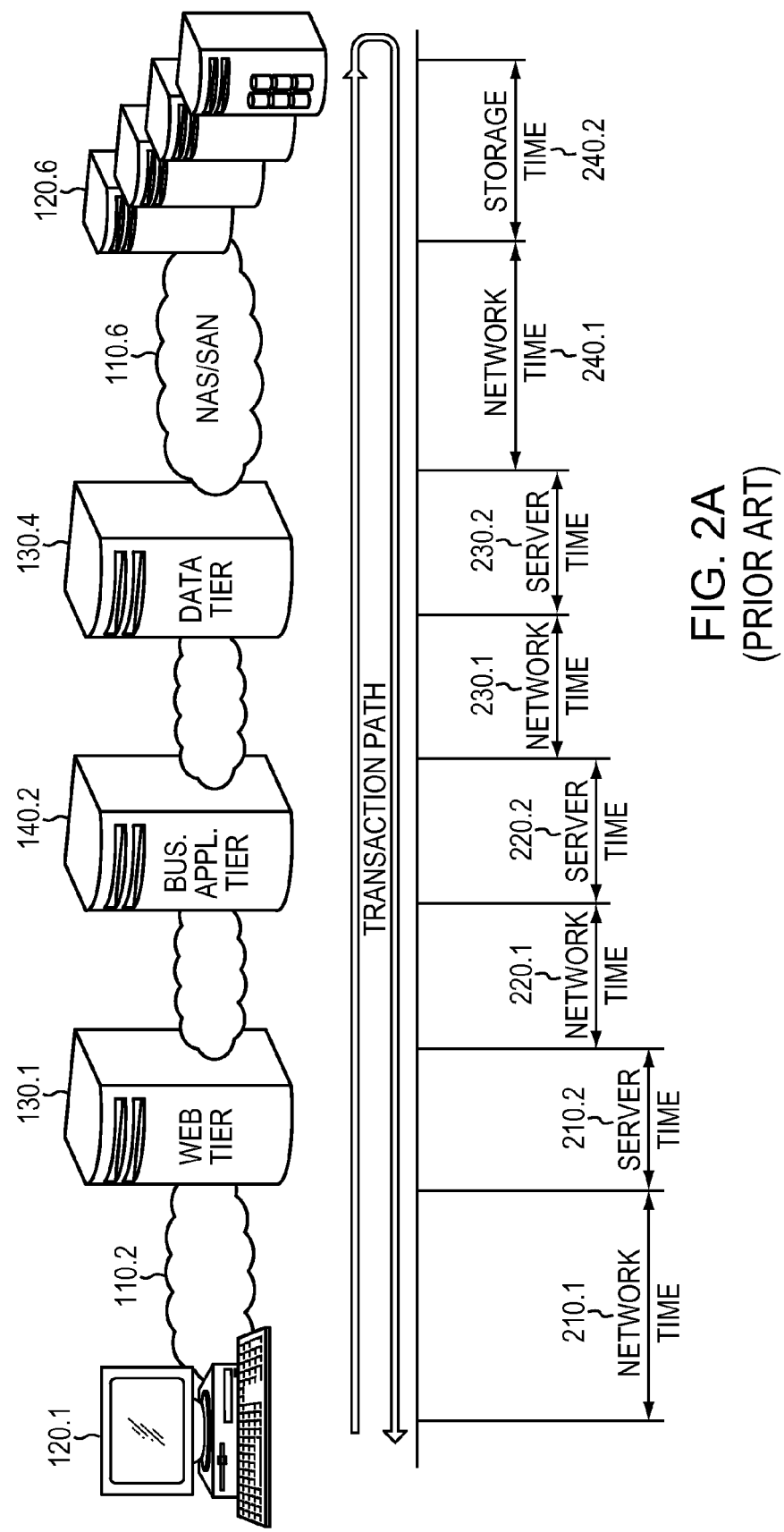
FIG. 2A illustrates an exemplary timing diagram for processing typical transactions.

FIG. 2A illustrates a timeline for determining an exemplary time-to-complete a transaction, i.e., a service, to an entry made at device 120.1 in an exemplary network. In this illustrative example, the time to complete the transaction of an entry made at device 120.1 includes the time, 210.1, for the entry to transit network 110, the time, 210.2 to process the entry at device (web tier server) 130.1 after traversing the network 100.2, the time to traverse a network or link to device 140.2 and the time 220.2 to process the entry at device 140.2. It would be recognized that the processing associated with server time 210.2 and 220.2 may be physically performed on the same device and, thus, the network time 220.1 may be non-existent and is merely logically represented herein. Similar network transitions and processor times are associated with each device in the path to complete the transaction; in this case, from device 120.1 to storage devices 120.6 and return. Thus, the service time or transaction path time, is determined as the serial accumulation of each of the measurable times. In a best case scenario, the minimum time to complete a transaction is the minimum time to complete each of the operations for each of the devices in the path. However, as the number of entries entering the network increases, one or more of the network response times or server response times may also increase as the operating loads at individual servers or devices increases. Accordingly, the time to complete the transaction increases until a point where a required SLA to complete the transaction may become unacceptable. In this case, identification of the sources of the increase in time is necessary to either introduce additional equipment to unburden the device or devices causing the increase in the transaction response time or to determine alternate routes by which the transactions may proceed.

Figure 2B:
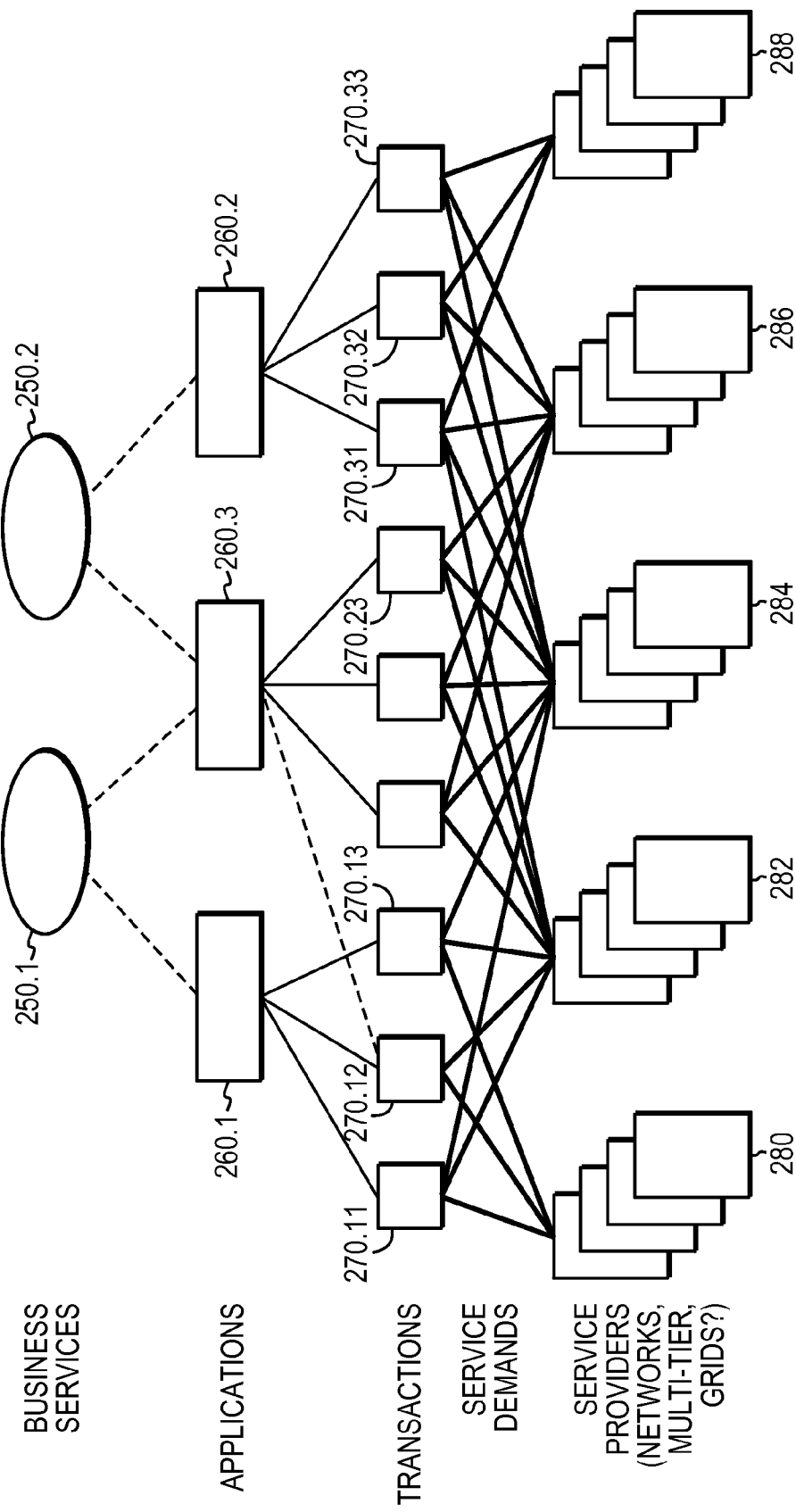
FIG. 2B illustrates a model representation of a typical network serving transactions from multiple applications.

FIG. 2B illustrates an exemplary model representation of a transaction performed over a network environment. In this illustrative case, a business may provide one or mores services, e.g., purchasing a product over the internet, to users, 250.1, 250.2. The business services, 250.1, 250.2, may each execute one or more service specific applications 260.1, 260.2 and common application 260.3. Each of the applications 260.1, 260.2, and 260.3 may execute one or more transactions 270.11, 270.13 . . . 270.23 that are specific to a particular application or may be shared among the applications, e.g., transaction 270.12. Transactions may be considered operations such as Display, Create, Read, Update, Delete of a file or an entry in a file or may be an action such as Submit or Cancel. Each of the transactions further operates on or are hosted by one or more underlying network elements, such as routers, servers, switches, etc. In this illustrative example, the underlying network elements are grouped together to form logical entities, 280 282, . . . 288, associated with the business service being provided.

In the illustrated model, the business service 250.1 may represent the presentation of items that a business may be offering for sale to the general public or may be a service to be provided or an interactive operation, e.g., a game or contest. The service 250.1 may use a graphic user interface (GUI) that allows a user to view information (e.g., description and cost) of the presented items and further enable the user to enter corresponding data (e.g., personal information, financial information) for ordering the item or providing instruction. Business service 250.2 may represent the response that a confirmation of the order has been received and further initiate processes within the application to fulfill the order placed. Business service 250.1, thus, may execute or invoke application 260.1 to display the GUI to the user, invoke application 260.3 to process the user entered data and make the user entered information available to business service 260.2. Service 250.2 utilizes the information provided by application 260.2 to confirm the user data is acceptable and application 260.3 completes the order process. Transactions 270.11, 270.12 . . . 270.23 represent the individual processing steps required to complete the processing of the associated applications. Service providers 280 . . . 288 represent the underlying physical entities (e.g., communication protocols, communication links, network elements, software elements, etc.) necessary to complete the transaction. Services providers 280 . . . 288 may represent the logically entities associated with the elements 120.1, 130.1, 140.2 130.4 and 120.6 shown in FIG. 2A.

Figure 3A:
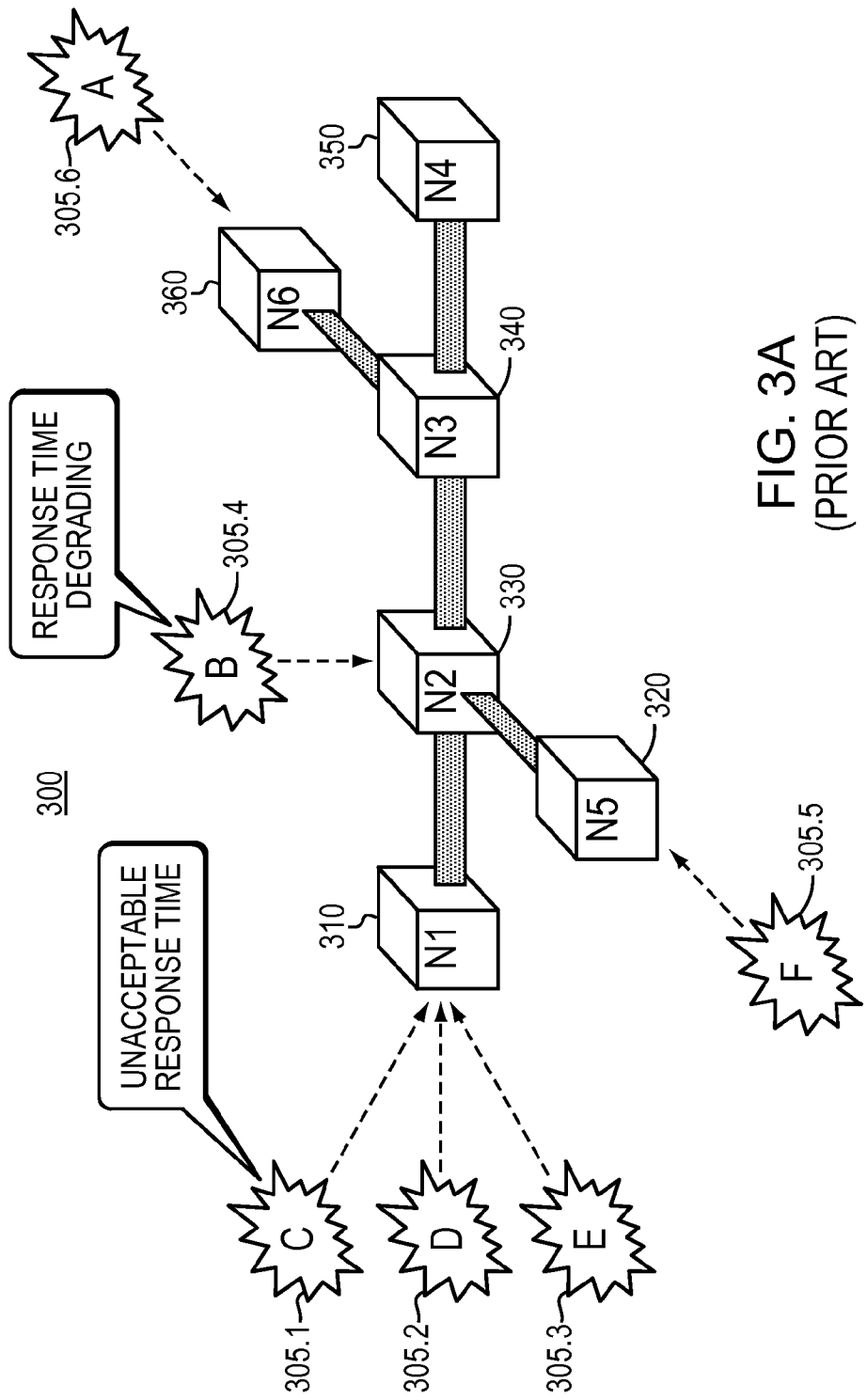
FIGS. 3A and 3B illustrate examples of network operating conditions causing service degradation.

FIG. 3A illustrates an exemplary situation wherein an unacceptable SLA may occur because of inappropriate loading within a network; an SLO being exceeded. In this illustrative case, devices 305.1, 305.2, and 305.3 are connected to a network through device 310. Device 305.4 is connected to the network through device 330 and device 305.5 is connected to the network through device 320. Device 320 is further connected to device 330. Also device 305.6 is connected to the network through device 360, which is further connected to device 340. Device 340 is further connected to devices 330 and 350. Device 350 represents the end-point of the illustrative network. In this illustrated example, devices 305.1, 305.2 and 305.3 may exhibit acceptable response time until such time that devices 305.4 and/or 305.5 are connected, and begin to provide data to the network. In this case, the response time (SLA) associated with a transaction initiated at device 305.1 may increase significantly or become unacceptable because of the additional load imposed upon the system. This unacceptable response time may be caused by device 330, for example, having insufficient capacity to handle the additional data load. In another example, when device 305.6 comes on-line, the response time associated with device 305.4 may also, as illustrated, become unusually high, and degradation in the response time of device 305.4 may be noticed.

In each of these situations, the response time (SLO) that is measured at device 305.1 or device 305.4 indicates some device error condition. However, the cause of the error condition is not the indicating device, as the degraded SLA is noticed, but rather from some operating condition within one of the other network devices; in this case, device(s) 330 and/or 340.

Figure 3B:
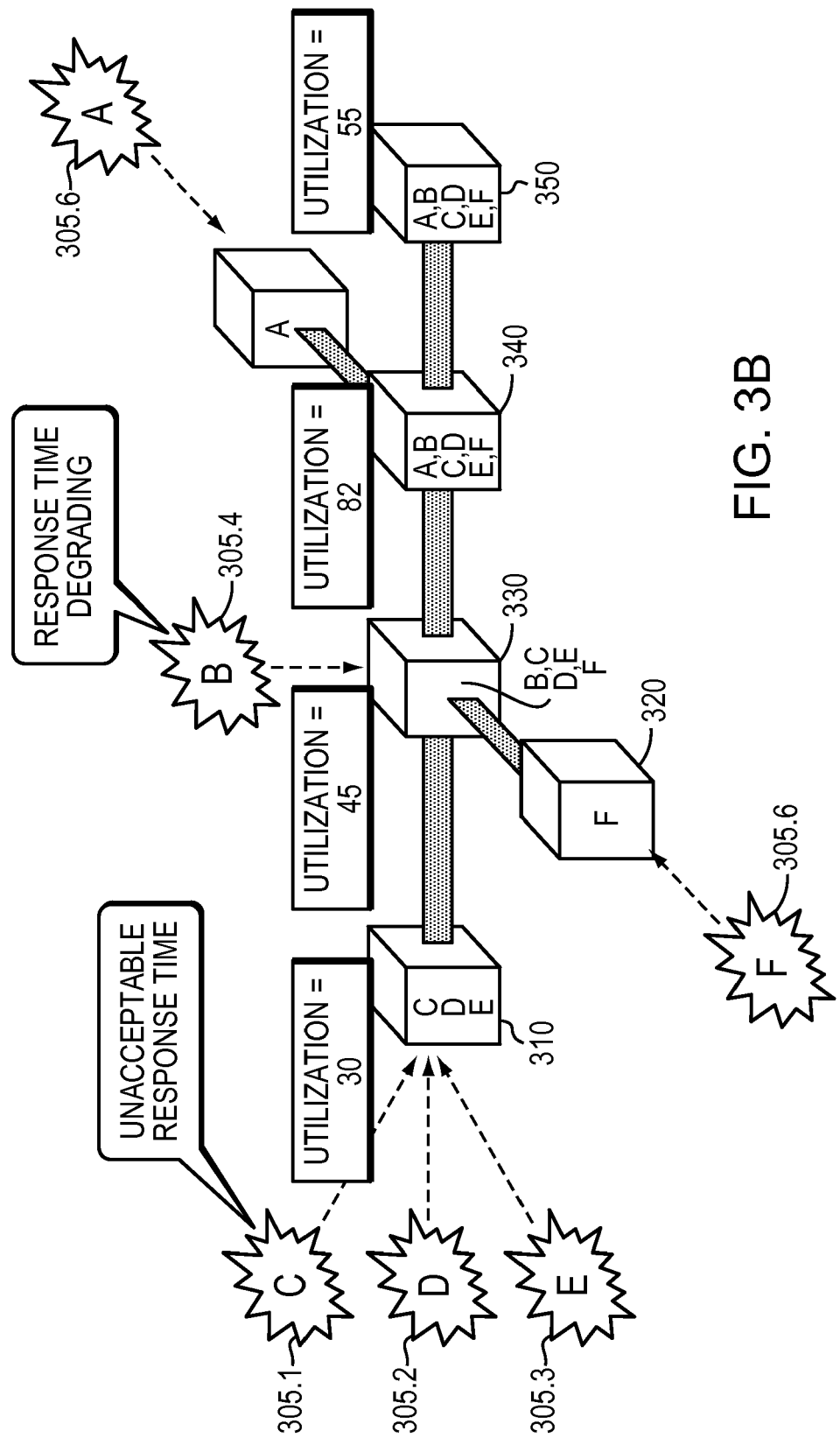

FIG. 3B illustrates an example of the situation shown in FIG. 3A, wherein a measurable utilization, e.g., CPU, I/O, buffer status, etc., is used to represent a device SLO. The selected utilization of each device may be monitored and measured to determine an impact on an overall transaction SLA. In this illustrative case, device 310 possesses a utilization factor of 30 when data is received from devices 305.1, 305.2 and 305.3. Utilization may be determined by factors such as CPU speed, memory, data throughput, input/output buffer sizing, distributed among the one or more devices represented by device 310, etc. It would be appreciated that each of the network elements 310, 330, 340 and 350 may logically represent at least one hardware device and/or software program hosted by the devices.

Device 330 possess a utilization factor of 45 when data is received from devices 305.1, . . . 305.5 at device 330. In this illustrative example, a utilization factor of 45 at device 330 may represent a burden that causes the response time of device 305.1 to degrade or even become unacceptable. As would be recognized, the utilization factor of device 330 is determined based on the operating conditions of device 330. The utilization factor of device 330 may or may not represent a normalization of the utilization factor with regard to the utilization factors of other devices in the network. Thus, a value of 45 associated with device 330 may not necessarily represent a higher utilization of device 330 than that of device 310, for example. However, in this illustrative example, and for simplifying the description of the invention, the utilization factor of the devices, as described herein is considered to be normalized so that a higher utilization factor represents a greater measured use of the resources associated with the device.

Also illustrated is the utilization factor of device 340 at 82 when device 305.6 is providing data to the network. In this illustrative case, the utilization factor has increased as device 340 is processing data from each of the source devices 305.1 . . . 305.6. Similarly, device 350 is shown processing data from each of the source devices 305.1 . . . 305.6 and possessing a utilization factor of 55. As described above, in this situation the transaction time associated with device 305.1 may degrade to a point where it is unacceptable and that the SLO associated with device 305.4 degraded to a point where it is very close to being unacceptable. However, whether device 340 or 350 is the source of the unacceptable or degraded performance of the overall SLA is unknown. For example, device 350 may be designed for a utilization of 50 and, thus, the illustrative utilization factor of 55 exceeds the design criteria, while device 340 may be designed for a utilization of 90 and does not exceed its design criteria. Thus, the unrelated device utilization factors (SLOs) may be used to determine the effect on the higher level service SLA.

Figure 4:
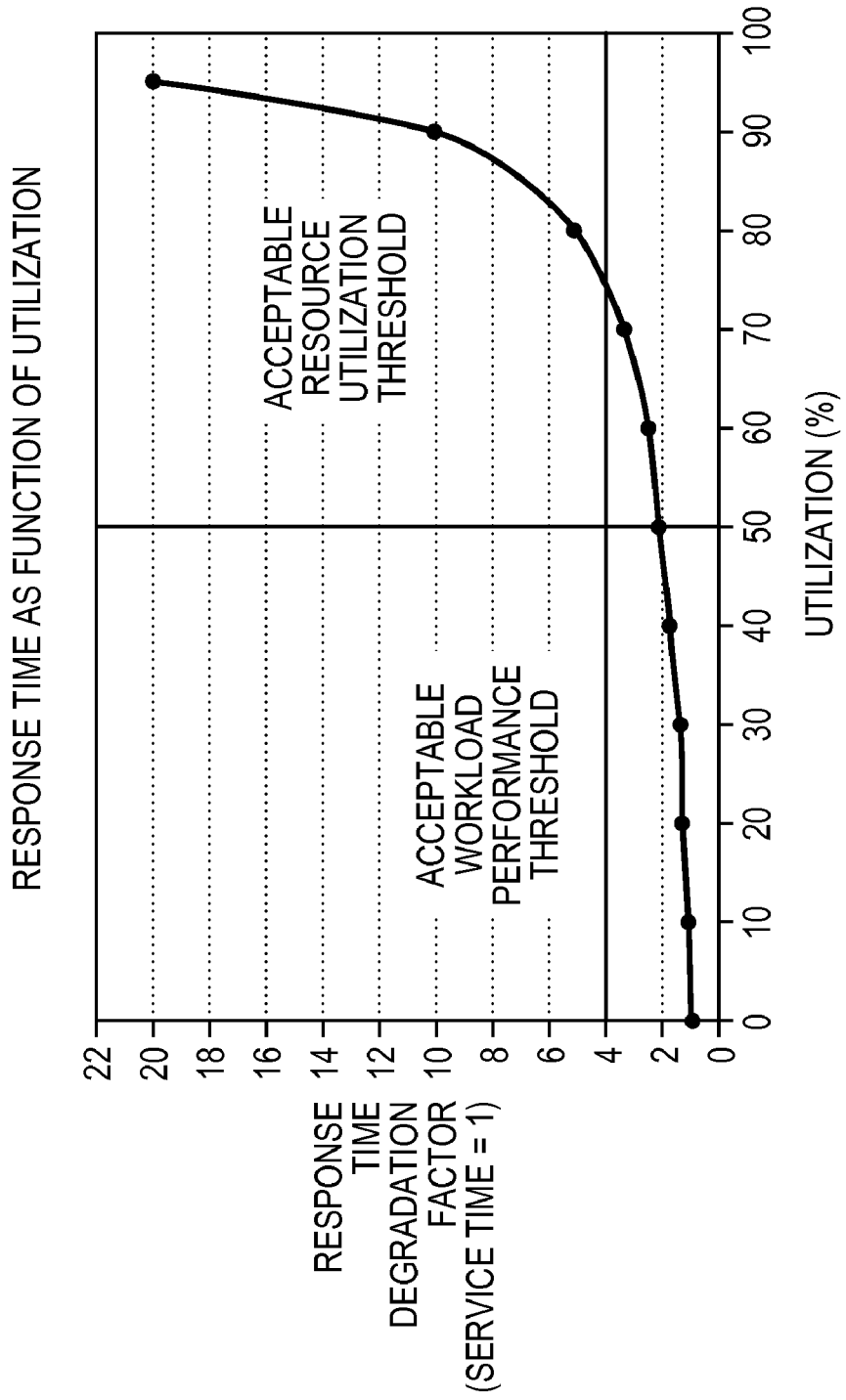
FIG. 4 illustrates a graph of response time versus utilization.

FIG. 4 graphically illustrates an exemplary method for determining an SLO threshold to fulfill a desired SLA requirement. More specifically, a device response time may be determined as:

$$\text{Service rate} = 1/(\text{Service time}) \quad [1]$$

where Service time represents the time for the device to service an input.
The utilization may be determined as:

$$\text{Utilization} = \text{Arrival rate}/\text{Service rate} \quad [2]$$

where Arrival rate represents the average rate of arrival of an input data packet.

The device response time may then be determined as:

$$\text{Response Time} = \text{Service time}/(1-\text{Utilization}) \quad [3]$$

From equation 3, a device response time may be determined based on a desired utilization or alternatively a maximum utilization may be determined based on a desired response time, as shown in FIG. 4.

After determining a response time for each of the devices and/or networks in a transaction path, a transaction response time ($R_t$) may be determined, as shown in FIG. 2, as:

$$R_t = \Sigma_1^{ndevices} \text{ResponseTime} \quad [4]$$

From equation 4, the response time, and corresponding utilization (SLO), of each device may be appropriately adjusted to achieve a desired transaction response time, $R_t$, and provide margin to indicate when an SLA may be impacted based on the conditions of one or more SLOs.

The information regarding a required transaction time or utilization factor per (logical) device may be used to determine a threshold value lower than the transaction time or utilization factor associated with the device. The device may then be monitored with regard to the measured quantity to determine whether the corresponding device is experiencing or about to experience a condition that may affect the overall SLA. For example, when the measured utilization factor associated with a device exceeds a determined threshold value, an event, i.e., a triggering event, may be generated that indicates a potential error condition may exist. Thus, before an unacceptable service SLA condition is detected, an event, associated with an underlying SLO, may be generated to forewarn of the potentially unacceptable SLA and knowledge of the cause of the triggering event(s) may be used to determine a remedial action.

In another aspect, after a triggering event occurs, an associated threshold value may be adjusted to, or be replaced by a predetermined, alternate threshold value. In this case, when the second threshold value is exceeded a second triggering event may be generated to provide additional information regarding the continued potential of an overloaded or overburdened device. In this aspect of the invention, the threshold value may be dynamically adjusted to monitor the increase in utilization and provide ever increasing urgency in the need for some corrective action. The monitoring of the events could thus register the occurrence of an increased utilization or a change in utilization per unit time.

In one aspect of the invention, after the first, second or third occurrence of any other number of similar triggering events, the associated information provided may be utilized to initiate or setup additional resources to assist the potentially overloaded device.

Returning to the example shown in FIG. 3B, indicators may be generated from each of the elements 305.1, 350 and possibly 340, as the utilization factors increases as additional devices (and data) are introduced into the network. More specifically, element 305.1 may generate an indicator or event to signify the determination that the response time has reached or exceeded an associated threshold value(s) or has even exceeded the allowable SLO. Similarly, the element 350 may generate one or more indicators to signify that its utilization (SLO) has reached or exceeded an associated threshold value(s) or even exceeded the allowable SLO. In addition, element 340 may generate an indicator to signify that the utilization factor (in this illustrated case, 82) while not exceeding a design criterion, may exceed an established threshold value. Thus, element 340 may be considering operating at a utilization level that has the potential of exceeding a maximum value if additional users or data are introduced into the network. The high levels illustrated may introduce significant processing delays such that the SLA of a transaction performed by element 305.1 is close to, or exceeds, its maximum allowable value.

Thus, as shown, a number of related and dependent indicators may be generated because of the operating conditions of one or more network elements. In one aspect of the invention, each of the generated indicators are processed and evaluated to determine which of the network elements requires immediate attention and which of the network elements are generating indicators because of other factors in the network. Preferably, a method and system similar to that discussed in commonly-owned U.S. Pat. Nos. 5,528,516; 5,661,668; 6,249,755; 6,868,367, and 7,003,433, the contents of which are incorporated by reference herein, may be used to determine the cause of the triggering events or indicators being generated. The aforementioned US Patents teach performing a system analysis based on a mapping of observable events and detectable events, e.g., symptoms and problems, respectively. With respect to the present invention, the generation of triggering events associated with performance issues represent the observed symptoms, and the causes associated symptoms are represented as problems.

Figure 5A:
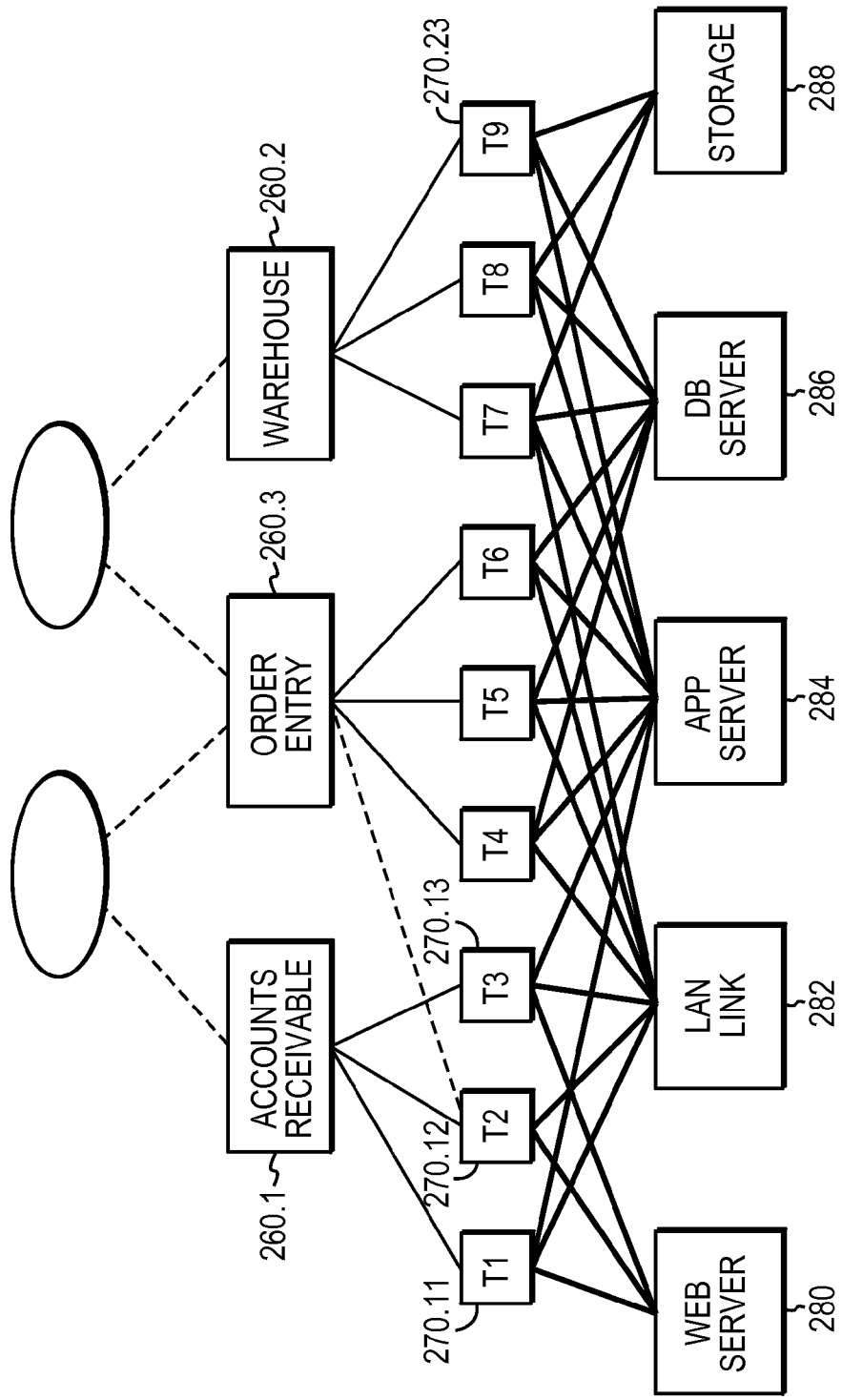
Figure 5B:
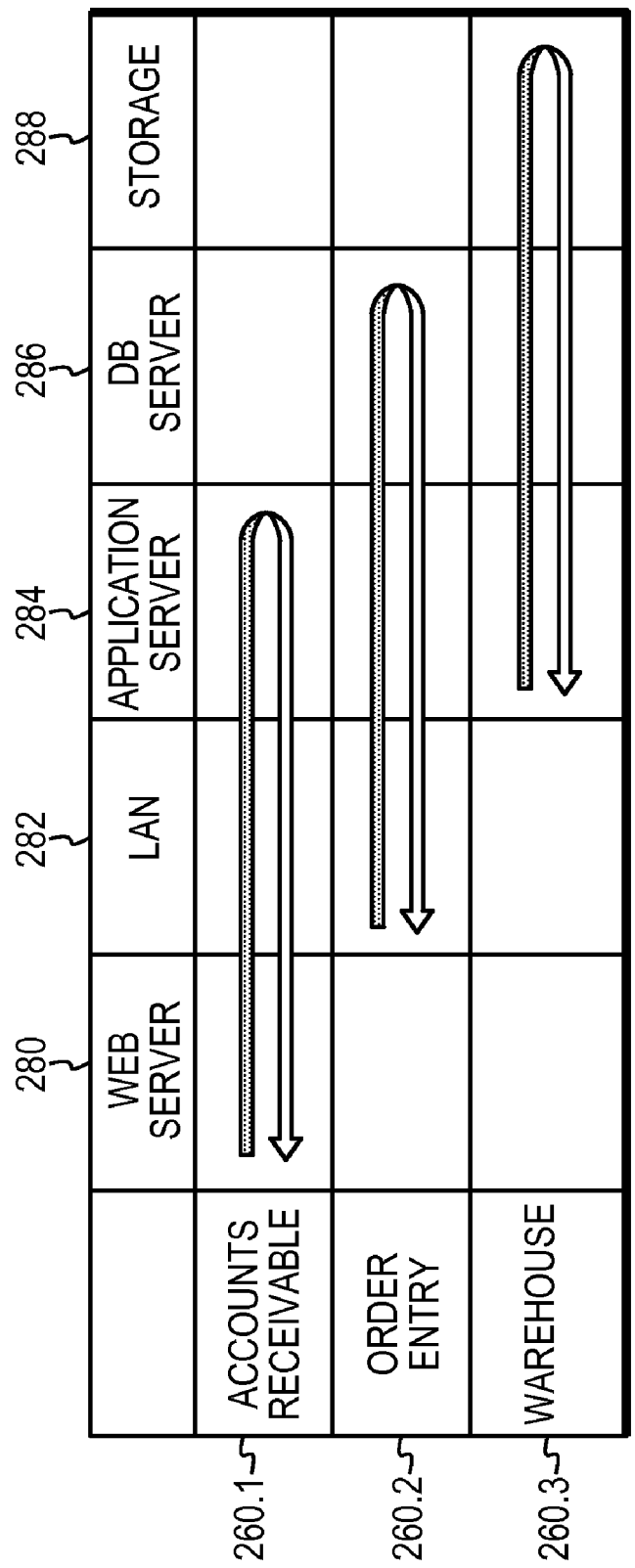

FIGS. 5A-5C collectively illustrate an exemplary model of a business transaction and a method of determining the causes or sources of performance degradation in the business transaction in accordance with the principles of the invention.

FIG. 5A illustrates an exemplary business process, similar to that shown in FIG. 2A, that includes applications referred to as Accounts Receivable, 260.1, Order Entry, 260.3 and Warehouse 260.2. Application Receivable 260.1 refers to those processes, illustrated as transactions T1, 270.11, T2, 270.12 and T3, 270.13, which enable a user to (1) view, either textually or visually, products or services that may be offered for sale, (2) enter personal data such as name, and address, and financial data, such as credit card information, and (3) submit the entered information along with the product information. Similarly, Order application 260.3, incorporates processes, i.e., transactions T4, T5 and T6, to process the information provided by the user and operates on the provided information to charge the user for the selected items and provide necessary data to a warehouse application 260.2 to collect and ship the selected items. Warehouse application 260.2 incorporates processes, i.e., transactions T7, T8 and T9, 270.23, to receive data regarding user personal information and shipping, if required, the selected items to the user.

Also illustrated are the underlying elements that are utilized in processing each of the transactions of each of the applications. In this case, the underlying elements are represented as WebServer 280, LanLink 282, ApplicationServer 284, DataBaseServer 286 and Storage 288. WebServer 280 logically represents the hardware and software elements that enable an interactive communication between a business and a user, e.g., a web browser, GUI, etc. LANLink 282 represents the Local Area Network links that allow communication between the user and the business, e.g., the internet. ApplicationServer 284 represents the server(s) that host the business application. DBServer 286 represents part of the business' backend processing and as illustrated is independent of the user inputs. That is, the AccountsReceivable application, which allows interactive communications between the user and the business, has no transactions associated with the DBServer 286. Storage 288 represents the storage media that records the user provided information, the business inventory, etc.

Although, the business transaction shown herein is limited with regard to the number of applications and transactions performed by each application, it would be recognized that this limitation is only for the purpose of illustrating the principles of the invention and should not be considered as a limitation upon the number or type of applications or transactions that may be performed by a business transaction. Similarly, the exemplary model shown with regard to a typical business transaction should not be considered as a limitation on the type of business transactions that are considered within the scope of the invention.

FIG. 5B illustrates, graphically, the round trip transaction time for each of the applications with respect to the underlying elements, WebServer, LAN, ApplicationServer, DBServer and Storage. In this illustrative example, the time required for the AccountReceivable application to complete is based on only three of the five illustrated elements. Similarly, the time required for the OrderEntry and the Warehouse applications to complete is based on three of the five illustrated applications. From FIG. 5B it can be seen that a degradation in the processing of WebServer 280 affects only the AccountsReceivable application 260.1, whereas a degradation in the processing of ApplicationServer 284 affects each of the applications.

FIG. 5C illustrates an exemplary correlation matrix for determining a cause of a degradation in system performance in accordance with the principles of the invention. In this illustrative correlation matrix, the columns, denoted as SP1 . . . SP5, represent the underlying elements WebServer, LANLink, ApplicationServer, DBServer and Storage, respectively. The rows represent observable events that may be generated because of a physical failure of one or more of the underlying elements or a degradation in one or more of the transactions associated with the applications. More specifically, the rows labeled SP1 . . . SP5, represent the underlying elements WebServer, LANLink, ApplicationServer, DBServer and Storage, respectively, as discussed. In this case, occurring within the WebServer is caused only by the WebSever element. Hence an value or indicator, which may be a fixed value, i.e., logical "1" or a probabilistic value p, at the intersection of the appropriate row and column may be used to indicate that the associated entry has exceeded a predetermined threshold value. Similarly, when a transaction, such as T1, indicates a degraded performance has been determined, i.e., a utilization factor threshold has been exceeded, and the cause of the degraded performance may be attributed to one or more of the elements (SP1, SP2 or SP3). In a similar manner, if transaction T4 indicates a degraded performance, then the cause of the degraded performance may be attributed to one or more of SP2, SP3 or SP4.

Utilizing the information associated with each of the observed events, a cause of the observed events may thus be determined. For example, if observed events associated with each of T1 through T9 occurs and no indication is provided that SP3 has outright failed, then it may be unambiguously determined that SP3 is operating beyond its performance capability or capacity and if left to continue may cause a noticeable degradation in the overall transaction performance (i.e., SLA).

Figure 6D:
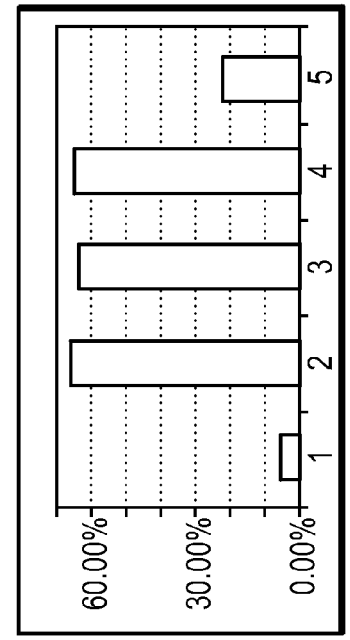

FIGS. 6A-6I collectively illustrate an example of dynamically configuring a network in view of determinations that one or more SLOs have exceeded predetermined threshold values. FIG. 6A illustrates a spreadsheet for implementing the calculations shown in Equations 1-4, herein, with regard to the service model shown in FIG. 5A. As illustrated applications 260.1, 260.2, 260.3 is comprised of transactions, t1 . . . t9, with each application performing three transaction. Each transaction is designed for an expected transaction rate (i.e., transactions executed per unit time). Also illustrated are an exemplary number of initial units required for each provider (WebServer 280, LanLikn 282, AppServer 284, DBServer 286 and StorageArray, 288). In this case, the initial number of units is four (4) per provider for a total of 20 expected units. In addition the utilization of each provider is determined as 4.5%, 49.5%, 78.75%, 81.00% and 22.50%, respectively, based on this initial number of units.

Assuming further that a degradation factor threshold of three (3) units is set. Then in this illustrative case, triggering events or indications are generated by transactions t1 and t4-t9 as their respective transaction degradation factor is greater than the set threshold value. As would be recognized, the use of a single threshold factor, as described herein, is merely to illustrate the principles of the invention and should not be considered a limitation of the invention. Rather, in accordance with the principles of the invention, each transaction may have its own threshold value, which may be monitored.

In accordance with the correlation matrix shown in FIG. 5C, indications provided by transactions t1 and t4-t9 indicate that SP3 (i.e., AppServer 284) is the principle cause of a perceived degradation in a business service. This is despite the fact that AppServer has a utilization less that of DBServer 286 has a higher utilization (78.75 percent as opposed to 81.00 percent).

Referring to FIG. 6B, there is shown the change in the utilization of each of the providers with the addition of one extra unit to AppServer 284. In this case the utilization of AppServer 284 has decreased to 63 percent and the degradation factor of transaction t1 has decreased to 2.12, which is below the set threshold value. Similarly, the degradation factors of transactions t4-t9 have decreased. However, these values are still above the set threshold value and, hence, indications of potential degradation remain.

Referring to FIG. 5C, indications detected or observed being generated from transactions t4-t9 reveal that SP4 is the cause of these indications. Hence, additional units incorporated into SP4 may be recommended. Referring now to FIG. 6C, there is shown the change in the utilization of each of the providers with the addition of one extra unit to DBServer 286. In this case, the utilization has decreased to 63 percent and the degradation factor for each of the transactions has fallen below the set threshold value. In this illustrated case, the utilization measures are within a known tolerance and no further indications of performance degradation are generated by the transactions performance monitors.

However, in this illustrated case, the number of units has increased by two and the utilization of the providers ranges from 4.5 to 64.8 percent. The imbalance in the utilization factors provides a further indication that the number of units assigned to one or more providers may not be optimal. Hence, a step of balancing the transaction utilization factors is an optional process that may be used to reduce the number of units necessary to provide sufficient support for a desired service SLA. As would be recognized, the higher utilization factors may be easily reduced by the addition of even more units to each of the providers. However, adding additional units increases the cost of the network in both the purchase and maintenance of the additional units.

Figure 6F:
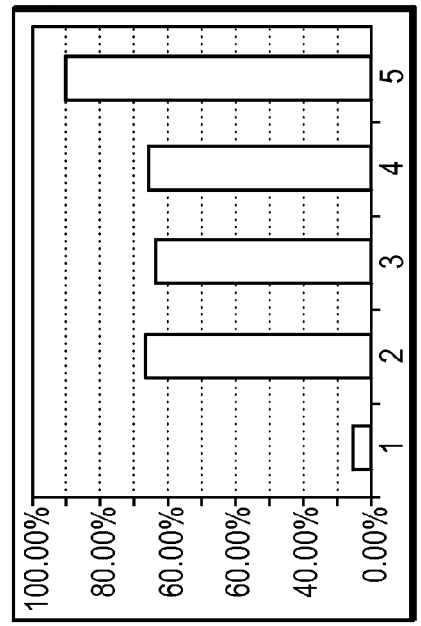
Figure 6H:
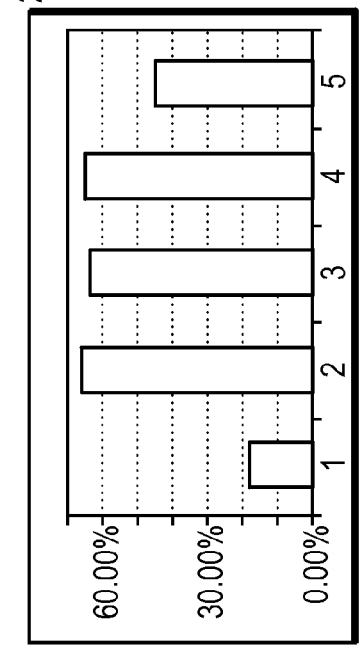

Referring to FIG. 6D, the balancing to the utilization may be performed by reducing the number of units of a provider to increase the associated utilization factors to match the highest utilization factor. For example, in this illustrative case, one unit is removed from the LanLink provider and its utilization increases to 66 percent with some increases in the degradation factor of transactions t1-t6. Referring to FIG. 6E, two units may be removed from StorageArray and its utilization increases to 45 percent with minor increase in the transaction degradation factor for transactions t7-t9. Referring to FIG. 6F, an additional unit is removed from Storage Array 288 and the utilization factor increases to 90 percent with significant increases in the degradation factor for transactions t7-t9. As discussed before, indications that the degradation factor has exceeded a threshold provides a determination of the cause of a potential degradation of the associated SLA. Thus, the number of units of StorageArray 288 is returned to two (2) as the minimum number of units for StorageArray 288 is two (see FIG. 6G). Concurrently, the number of units of WebServer 280 is reduced to three (3). In this case, no noticeable change in the transaction degradation occurs. Referring to FIG. 6H, the number of units of WebServer 280 is further reduced to one unit and only a slight increase in degradation factor is noticed. Thus, a minimum number of units to satisfy the desired SLA conditions for the system may be determined as sixteen (16) rather than the twenty (20) that was initially assigned.

FIG. 6I illustrates one aspect of the invention wherein a minimum number constraint is imposed upon the number of units per provider established. This minimum number, e.g., 2, may be imposed to compensate for failure conditions in one or the other unit. Thus, a failure in one unit thus does not cause the entire operation to cease. In this aspect of the invention, the total number of units is seventeen (17). In another aspect of the invention, the balancing of the resources may impose such constraints that the addition of resources of units may be required. For example, the balancing algorithm described herein may provide for additional units in case of a unit failure. Thus, in the present example, additional units may be added to SP2, SP3 and SP4, to reduce the current utilization values and insuring that a known utilization will be achieved even in the case of a failure.

While the utilization factors among the providers is not perfectly balance, other considerations regarding the number of units to be allocated or assigned provide limitations of the optimal utilization balancing.

Figure 7:
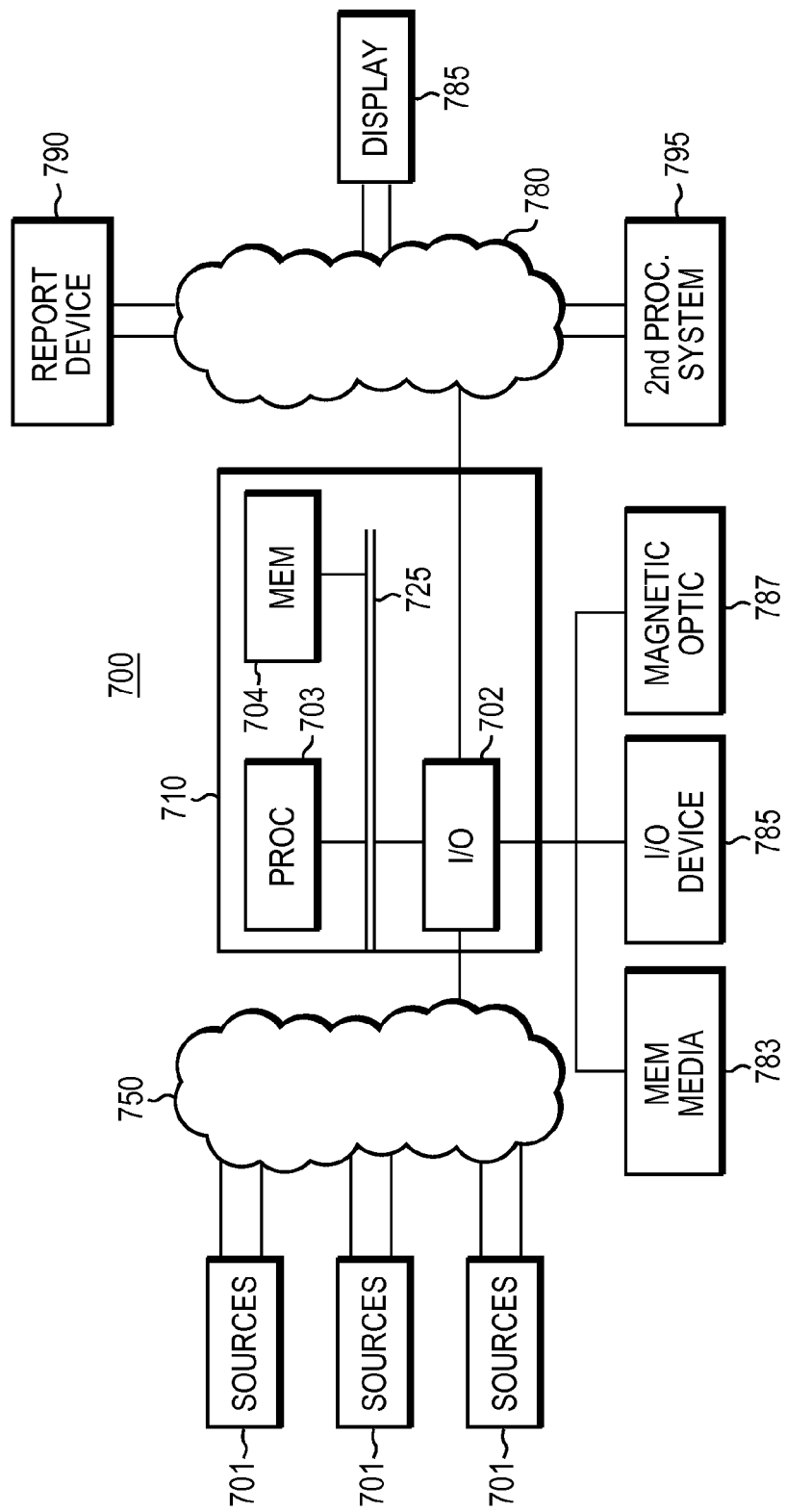
FIG. 7 illustrates an exemplary system for implementing the processing shown herein.

FIG. 7 illustrates an exemplary embodiment of a system 700 that may be used for implementing the principles of the present invention. System 700 may contain one or more input/output devices 702, processors 703 and memories 704. I/O devices 702 may access or receive information from one or more sources or devices 701. Sources or devices 701 may be devices such as routers, servers, computers, notebook computers, PDAs, cells phones or other devices suitable for transmitting and receiving information responsive to the processes shown herein. Devices 701 may have access over one or more network connections 750 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 702, processors 703 and memories 704 may communicate over a communication medium 725. Communication medium 725 may represent, for example, a bus, a communication network, one or more internal connections of a circuit, circuit card or other apparatus, as well as portions and combinations of these and other communication media. Input data from the client devices 701 is processed in accordance with one or more programs that may be stored in memories 704 and executed by processors 703. Memories 704 may be any magnetic, optical or semiconductor medium that is loadable and retains information either permanently, e.g. PROM, or non-permanently, e.g., RAM. Processors 703 may be any means, such as general purpose or special purpose computing system, such as a laptop computer, desktop computer, a server, handheld computer, or may be a hardware configuration, such as dedicated logic circuit, or integrated circuit. Processors 703 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The code may also be stored in the memory 704. The code may be read or downloaded from a memory medium 783, an I/O device 785 or magnetic or optical media, such as a floppy disk, a CD-ROM or a DVD, 787 and then stored in memory 704 or may be downloaded over one or more of the illustrated networks. As would be appreciated, the code may be processor-dependent or processor-independent. JAVA is an example of processor-independent code. JAVA is a trademark of the Sun Microsystems, Inc., Santa Clara, Calif. USA.

Information from device 701 received by I/O device 702, after processing in accordance with one or more software programs operable to perform the functions illustrated herein, may also be transmitted over network 780 to one or more output devices represented as display 785, reporting device 790 or second processing system 795.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It would be recognized that the invention is not limited by the model discussed, and used as an example, or the specific proposed modeling approach described herein. For example, it would be recognized that the method described herein may be used to perform an analysis that may include: fault detection, fault monitoring, performance, congestion, connectivity, interface failure, node failure, link failure, routing protocol error, routing control errors, and root-cause analysis. In addition, although the invention described herein is described with regard to network-based services it would be recognized that the method described is applicable to services provided over distributed systems.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for assigning resources for a service provided over a network composed of a plurality of hardware and software elements, the service including a plurality of applications each including at least one transaction, the transactions being executed by selected ones of the hardware and software resources, the method comprising the steps of:
   determining a transaction measure of utilization for each of the selected transactions;
   determining a resource measure of utilization for selected ones of each of the selected ones of the hardware and software resources;
   generating an indication for each transaction measure of utilization exceeding an associated utilization threshold value;
   generating an indication for each resource measure of utilization exceeding an associated utilization threshold value by the resource that exceeded the associated threshold;
   correlating the transactions generating the indications to the resources executing the transaction to create a mapping of the transactions generating the indications to the resources executing the transaction;
   using the mapping to perform a root cause analysis to determine the cause of the indication; wherein the root cause analysis is enabled to determine the cause of the indication when the cause of the indication is not directly associated with the transaction or resource generating the indication; and
   applying additional resources to the root cause of the indication until the measure of utilization is less than the associated threshold; wherein the step of determining the cause of the measure of utilization exceeding an associated utilization threshold, further comprises the steps of:
   associating a relationship for each of the selected transactions and each of the resources executing the transaction; and
   determining a match between the generated indications using the relationships associated with each of the resources executing the transaction.

2. The method as recited in claim 1, further comprising the step of:
   balancing the measure of utilization associated with each of the selected transactions wherein each of the measures of utilization is within a known tolerance to each other measure of utilization.

3. The method as recited in claim 2, wherein step of balancing comprises the step of:
   removing resources associated with a selected ones of the transactions.

4. The method as recited in claim 3, wherein the step of removing resources is limited by a known minimum number of resources.

5. The method as recited in claim 1, further comprising the step of:
   associating each of the selected transactions with at least one of the network resources.

6. An apparatus for assigning resources for a service provided over a network composed of a plurality of hardware and software elements, the service including a plurality of applications each including at least one transaction, the transactions being executed by selected ones of the hardware and software resources, the apparatus comprising:

a processor in communication with a memory, the processing executing software instructions to execute the steps of:

determining a transaction measure of utilization for each of the selected transactions;

determining a resource measure of utilization for selected ones of each of the selected ones of the hardware and software resources;

generating an indication for each measure of utilization exceeding an associated utilization threshold value;

generating an indication for each resource measure of utilization exceeding an associated utilization threshold value by the resource that exceeded the associated threshold;

correlating the transactions generating the indications to the resources executing the transaction to create a mapping of the transactions generating the indications to the resources executing the transaction;

using the mapping to perform a root cause analysis to determine the cause of the measure of utilization exceeding the associated utilization threshold value; wherein the root cause analysis is enabled to determine the cause of the indication when the cause of the indication is not directly associated with the transaction or resource generating the indication; and applying additional resources to the root cause of the indication until the measure of utilization is less than the associated threshold; wherein the step of determining the cause of the measure of utilization exceeding an associated utilization threshold, further comprises the steps of:

associating a relationship for each of the selected transactions and each of the resources executing the transaction; and determining a match between the generated indications using the relationships associated with each of the resources executing the transaction; wherein the utilization threshold value is a predictive threshold forewarning of an unacceptable SLA; wherein knowledge of the cause of the triggering event enables action to be taken to proactively remediate the condition that caused the utilization threshold to be exceeded before the SLA is violated.

7. The apparatus as recited in claim 6, wherein the processor further executing software instruction for executing the step of:

balancing the measure of utilization associated with each of the selected transactions wherein each of the measures of utilization is within a known tolerance to each other measure of utilization.

8. The apparatus as recited in claim 7, wherein step of balancing comprises the step of:

removing resources associated with a selected ones of the transactions.

9. The apparatus as recited in claim 8, wherein the step of removing resources is limited by a known minimum number of resources.

10. The apparatus as recited in claim 6, wherein the processor further executing software instruction for executing the step of:

associating each of the selected transactions with at least one of the network resources.

11. Computer readable code stored on a non-transitory computer readable medium for assigning resources for a service provided over a network composed of a plurality of hardware and software elements, the service including a plurality of applications each including at least one transaction, the transactions being executed by selected ones of the hardware and software, the computer program product providing instruction to a processor enabling the processor to execute the steps of:

monitoring a transaction measure of utilization for each of the selected transactions;

monitoring a resource measure of utilization for selected ones of each of the selected ones of the hardware and software resources;

generating an indication for each measure of utilization exceeding an associated utilization threshold value;

generating an indication for each resource measure of utilization exceeding an associated utilization threshold value by the resource that exceeded the associated threshold;

correlating the transactions generating the indications to the resources executing the transaction to create a mapping of the transactions generating the indications to the resources executing the transaction;

using the mapping to perform a root cause analysis to determine the cause of the measure of utilization exceeding the associated utilization threshold value; wherein the root cause analysis is enabled to determine the cause of the indication when the cause of the indication is not directly associated with the transaction or resource generating the indication; and applying additional resources to the root cause of the indication until the measure of utilization is less than the associated threshold; wherein the step of determining the cause of the measure of utilization exceeding an associated utilization threshold, further comprises the steps of:

associating a relationship for each of the selected transactions and each of the resources executing the transaction; and determining a match between the generated indications using the relationships associated with each of the resources executing the transaction; wherein the utilization threshold value is a predictive threshold forewarning of an unacceptable service level agreement (SLA); wherein knowledge of the cause of the triggering event enables action to be taken to proactively remediate the condition that caused the utilization threshold to be exceeded before the SLA is violated.

12. The computer readable code as recited in claim 11, providing further instruction to the processor causing the processor to execute the step of:

balancing the measure of utilization associated with each of the selected transactions wherein each of the measures of utilization is within a known tolerance to each other measure of utilization.

13. The computer readable code as recited in claim 12, wherein the step of balancing comprises the step of:

removing resources associated with a selected ones of the transactions.

14. The computer readable code as recited in claim 13, wherein the step of removing resources is limited by a known minimum number of resources.

15. The computer readable code as recited in claim 11, providing further instruction to the processor causing the processor to execute the step of:

associating each of the selected transactions with at least one of the network resources.

* * * * *